United States Patent [19]
Uz et al.

[11] Patent Number: 5,854,658
[45] Date of Patent: Dec. 29, 1998

[54] STATISTICAL MULTIPLEXING SYSTEM WHICH ENCODES A SEQUENCE OF VIDEO IMAGES USING A PLURALITY OF VIDEO ENCODERS

[75] Inventors: K. Metin Uz, Mountain View, Calif.; Aaron Wells, New Rochelle, N.Y.

[73] Assignee: C-Cube Microsystems Inc., Milpitas, Calif.

[21] Appl. No.: 896,482

[22] Filed: Jul. 18, 1997

Related U.S. Application Data

[63] Continuation of Ser. No. 578,811, Dec. 26, 1995, Pat. No. 5,686,963.

[51] Int. Cl.$^6$ .............. H04N 7/12; H04N 11/02; H04N 11/04
[52] U.S. Cl. .......... 348/419; 348/390; 370/468; 375/260
[58] Field of Search ............... 348/384, 390, 348/409–413, 419, 420, 405; 370/468, 477, 545; 375/260; 341/67

[56] References Cited

U.S. PATENT DOCUMENTS

| | | | |
|---|---|---|---|
| 5,138,447 | 8/1992 | Shen et al. | 358/133 |
| 5,170,259 | 12/1992 | Niihara | 358/133 |
| 5,231,484 | 7/1993 | Gonzales et al. | 358/133 |
| 5,337,085 | 8/1994 | Lee et al. | 348/398 |
| 5,379,070 | 1/1995 | Retter et al. | 348/403 |
| 5,381,145 | 1/1995 | Allen et al. | 341/107 |
| 5,426,463 | 6/1995 | Reininger et al. | 348/405 |
| 5,461,679 | 10/1995 | Normile et al. | 382/304 |
| 5,485,215 | 1/1996 | Meyer et al. | 348/423 |
| 5,506,844 | 4/1996 | Rao | 370/84 |
| 5,532,744 | 7/1996 | Akiwumi-Assani et al. | 348/390 |
| 5,579,052 | 11/1996 | Arteri | 348/416 |
| 5,596,659 | 1/1997 | Normile et al. | 382/253 |
| 5,640,388 | 6/1997 | Woodhead et al. | 370/468 |
| 5,646,687 | 7/1997 | Botsford, III et al. | 348/402 |
| 5,650,860 | 7/1997 | Uz | 358/430 |
| 5,654,760 | 8/1997 | Ohtsuki | 348/405 |
| 5,668,598 | 9/1997 | Linzer et al. | 348/402 |
| 5,682,204 | 10/1997 | Uz et al. | 348/409 |
| 5,686,963 | 11/1997 | Uz et al. | 348/404 |
| 5,694,170 | 12/1997 | Tiwari et al. | 348/390 |
| 5,701,160 | 12/1997 | Kimura et al. | 348/413 |
| 5,731,837 | 3/1998 | Hurst, Jr. | 348/405 |

*Primary Examiner*—Tommy P. Chin
*Assistant Examiner*—David R. Vincent
*Attorney, Agent, or Firm*—Meltzer, Lippe, Goldstein, et al.

[57] ABSTRACT

A rate control algorithm for an MPEG-2 compliant encoder wherein the rate control algorithm has embodiments useful for constant bit rate and variable bit rate encoding. In particular, the present invention relates to statistical multiplexing.

3 Claims, 9 Drawing Sheets

FRAME BLOCK

FIELD BLOCK

STATISTICAL MULTIPLEXING SYSTEM
WHICH ENCODES A SEQUENCE OF VIDEO
IMAGES USING A PLURALITY OF VIDEO
ENCODERS

This is a continuation, of application U.S. Ser. No. 578,811, filed Dec. 26, 1995 now U.S. Pat. No. 5,686,963.

FIELD OF THE INVENTION

The present invention relates to a method for encoding video images. In particular, the present invention relates to a method for performing rate control for a video encoder. The inventive rate control technique has an embodiment for constant bit rate encoding and an embodiment for variable bit rate encoding.

In particular, the present invention relates to statistical multiplexing.

BACKGROUND OF THE INVENTION

In a preferred embodiment of the invention, the video encoder is an MPEG-2 compliant encoder. The encoder receives a sequence of frames from a video source. The sequence of frames may be progressive or interlaced. Illustratively, the progressive sequence comprises 30 frames per second. In the case of an inter-laced sequence, each frame comprises two fields. A top field comprises the even numbered rows and a bottom field comprises the odd numbered rows. Thus, in the case of an interlaced sequence, there are 60 fields per second.

The video source may be any source of a digital video signal such as a video camera or a telecine machine. A telecine machine converts a film comprising 24 frames per second into a 60 field per second digital video signal using 3:2 pull down. The 3:2 pull down technique provides for generating two video fields and three video fields for alternating film frames. For a film frame which is converted into three video fields, the third field is a repeat of the first field.

The video encoder utilizes a compression algorithms to generate an MPEG-2 compliant bit stream from the input sequence of frames. (See ISO/IEC 13818-2)

The MPEG-2 bit stream has six layers of syntax. There are a sequence layer (random access unit, context), Group of Pictures layer (random access unit, video coding), picture layer (primary coding layer), slice layer (resynchronization unit), macroblock (motion compensation unit) and block layer (DCT unit). A group of pictures (GOP) is a set of frames which starts with an I-frame and includes a certain number of P and B frames. The number of frames in a GOP may be fixed or may be variable. Each frame is divided into macroblocks. Illustratively, a macroblock comprises four luminance blocks and two chrominance blocks. Each block is 8×8 pixels.

The encoder distinguishes between three kinds of frames (or pictures), I, P. and B. Typically, the coding of I frames results in the most bits. In an I-frame, each macroblock is coded as follows. Each 8×8 block of pixels in a macroblock undergoes a DCT (discrete cosine transform) transform to form a 8×8 array of transform coefficients. The transform coefficients are then quantized with a variable quantizer matrix. Quantization involves dividing each DCT coefficient F[v][u] by a quantizer step size. The quantizer step size for each AC DCT coefficient is determined by the product of a weighting matrix element W[v][u] and a quantization scale factor (also known as mquant). As is explained below, in some cases the quantization scale factor $Q_n$ for a macroblock n is a product of a rate control quantization scale factor $Q_n^R$ and a masking activity quantization scale factor $(QS_n)$. However, this factorization of the quantization scale factor $Q_n$ is optional. The use of a quantization scale factor permits the quantization step size for each AC DCT coefficient to be modified at the cost of only a few bits. The quantization scale factor is selected for each macroblock.

The resulting quantized DCT coefficients are scanned (e.g., using zig-zag scanning) to form a sequence of DCT coefficients. The DCT coefficients are then organized into run-level pairs. The run-level pairs are then encoded using a variable length code (VLC). In an I-frame, each macroblock is encoded according to this technique.

In a P frame, a decision is made to code each macroblock as an I macroblock, which macroblock is then encoded according to the technique described above, or to code the macroblock as a P macroblock. For each P macroblock, a prediction of the macroblock in a previous video frame is obtained. The predication is identified by a motion vector which indicates the translation between the macroblock to be coded in the current frame and its prediction in the previous frame. (A variety of block matching algorithms can be used to find the particular macroblock in the previous frame which is the best match with the macroblock to be coded in the current frame. This "best match" macroblock becomes the prediction for the current macroblock.) The predictive error between the predictive macroblock and the current macroblock is then coded using the DCT, quantization, zig-zig scanning, run-level pair encoding, and VLC encoding.

In the coding of a B-frame, a decision has to be made as to the coding of each macroblock. The choices are (a) intracoding (as in an I macroblock), (b) unidirectional forward predictive coding using a previous frame to obtain a motion compensated prediction, (c) unidirectional backward predictive coding using a subsequent frame to obtain a motion compensated prediction, and (d) bidirectional predictive coding, wherein a motion compensated prediction is obtained by interpolating a backward motion compensated prediction and a forward motion compensated prediction. In the cases of forward, backward, and bidirectional motion compensated prediction, the predictive error is encoded using DCT, quantization, zig-zig scanning, run-level pair encoding and VLC encoding.

The P frame may be predicted from an I frame or another P frame. The B frame may also be predicted from an I frame or a P frame. No predictions are made from B frames.

B frames have the smallest number of bits when encoded, then P frames, with I frames having the most bits when encoded. Thus, the greatest degree of compression is achieved for B frames. For each of the I, B, and P frames, the number of bits resulting from the encoding process can be controlled by controlling the quantizer step size (adaptive quantization) used to code each macroblock. A macroblock of pixels or pixel errors which is coded using a large quantizer step size results in fewer bits than if a smaller quantizer step size is used.

After encoding by the video encoder, the bit stream is stored in an encoder output buffer. Then, the encoded bits are transmitted via a channel to a decoder, where the encoded bits are received in a buffer of the decoder, or the encoded bits may be stored in a storage medium.

The order of the frames in the encoded bit stream is the order in which the frames are decoded by the decoder. This may be different from the order in which the frames arrived at the encoder. The reason for this is that the coded bit stream contains B frames. In particular, it is necessary to code the I and P frames used to anchor a B frame before coding the B frame itself.

Consider the following sequence of frames received at the input of a video encoder and the indicated coding type (I, P or B) to be used to code each frame:

1 2 3 4 5 6 7 8 9 10 11 12 13

I B B P B B P B B I B B P

For this example there are two B-frames between successive coded P-frames and also two B-frames between successive coded I- and P-frames. Frames "1I" is used to from a prediction for frame "4P, and frames "1I" and "4P" are both used to form predictions for frames "2B" and "3B". Therefore, the order of coded frames in the coded sequence shall be "1I", "4P", "2B", "3B". Thus, at the encoder output, in the coded bit stream, and at the decoder input, the frames are reordered as follows:

1 4 2 3 7 5 6 10 8 9 13 11 12

I P B B P B B I B B P B B

In the case of interlaced video the following applies. Each frame of interlaced video consists of two fields. The MPEG-2 specification allows the frame to be encoded as a frame picture or the two fields to be encoded as two field pictures. Frame encoding or field encoding can be adaptively selected on a frame-by-frame basis. Frame encoding is typically preferred when the video scene contains significant detail with limited motion. Field encoding, in which the second field can be predicted from the first, works better when there is the fast movement.

For field prediction, predictions are made independently for the macroblocks of each field by using data from one or more previous fields (P field) or previous and subsequent fields (B field). For frame prediction, predictions are made for the macroblocks in a frame from a previous frame (P frame) or from a previous and subsequent frame (B frame). Within a field picture, all predictions are field predictions. However, in a frame picture either field prediction or frame prediction may be selected on a macroblock by macroblock basis.

An important aspect of any video encoder is rate control. The purpose of rate control is to maximize the perceived quality of the encoded video when it is decoded at a decoder by intelligently allocating the number of bits used to encode each frame and each macroblock within a frame. Note the encoder may be a constant bit rate (CBR) encoder or a variable bit rate (VBR) encoder. In the case of constant bit rate encoder, the sequence of bit allocations to successive frames ensures that an assigned channel bit rate is maintained and that decoder buffer exceptions (overflow or underflow of decoder buffer) are avoided. In the case of a VBR encoder, the constraints are reduced. It may only be necessary to insure that a maximum channel rate is not exceeded so as to avoid decoder buffer underflow.

In order to prevent a decoder buffer exception, the encoder maintains a model of the decoder buffer. This model maintained by the encoder is known as the video buffer verifier (VBV) buffer. The VBV buffer models the decoder buffer occupancy. Depending on the VBV occupancy level, the number bits which may be budgeted for a particular frame may be increased or decreased to avoid a decoder buffer exception.

It is an object of the present invention to provide a rate control technique for an MPEG-2 compliant encoder.

Specifically, it is an object of the invention to provide a rate control technique for a constant bit rate, real time MPEG-2 compliant encoder.

It is also an object of the invention to provide a rate control technique for a variable bit rate, non-real time MPEG-2 compliant encoder.

SUMMARY OF THE INVENTION

A. Hardware Overview

In accordance with a preferred embodiment of the invention, a video encoder includes a preprocessing unit, a master unit, and a zero or more of slave units. Each master or slave unit includes a motion estimation unit, and an encoder unit for performing DCT, quantization, zig-zag scan, run-level pair encoding, and VLC encoding. Each master or slave unit is used to encode a section of a picture which, for example, is four macroblocks high. Each master or slave unit has allocated to it a portion of a physical encoder output buffer.

Each master or slave unit also has a controller. The controllers of the slave units communicate with and are controlled by the controller of the master unit. The controllers in the master and slave units and the preprocessing unit cooperate to perform rate control for the encoder.

B. Rate Control Overview

In accordance with the present invention, a preferred rate control algorithm has the following features:

(1) A bit budget $BB_i$ is established for each frame i by allocating the total available coding rate $R_{eff}$ to each frame i based on the number of bits used to code the previous frame of the same type and the average quantization scale factor used to code the previous frame of the same type relative to the bits used and average quantization scale factor for the previous frames of the other types and the relative frequency of each frame type.

(2) The bit budget for each frame is allocated to the individual sections of the frame coded by the individual master or slave units based on a complexity measure for each section.

(3) The bit budget for each section is then allocated to each macroblock in the section based on a total activity measure for the macroblock. (A description of the total activity measure is provided below).

(4) Virtual buffers $v_I$, $v_P$, and $v_B$, corresponding to frame types I, B and P provide rate control feedback by adjusting the quantization scale factor. A rate control quantization scale factor $Q_n^R$ for a macroblock n in frame i is determined as a function of a ratio of virtual buffer fullness to virtual buffer size.

(5) A masking activity is determined for each macroblock which measures the amount of visual local masking in the macroblock. The rate control quantization scale factor determined from virtual buffer fullness is multiplied by a masking activity quantization scale factor which is dependent on the macroblock masking activity to obtain a total quantization scale factor.

(6) The bit budget $BB_i$ for a current frame i is increased or decreased based on the VBV buffer occupancy level to prevent VBV buffer overflow or underflow.

(7) The rate control may initiate a panic mode. A panic mode arises when a scene is encountered which generates too many bits, even when the quantization scale factor is set to the maximum size. In this case the encoder is in danger of generating too many bits for the channel to transfer to the decoder, thereby causing a "VBV underflow" bit stream error. In this case, the encoder enters the panic mode in which quality is sacrificed to guarantee a legal bit stream.

(8) The rate control algorithm takes into account changes in the effective coding rate $R_{eff}$. For a CBR encoder, the rate $R_{eff}$ may change because a particular encoder may be sharing a channel with a number of other encoders. A statistical multiplexing controller may change the fraction of the channel bandwidth allocated to the particular encoder. For a VBR encoder, the effective encoding rate $R_{eff}$ will change at various points in the bit stream. The changes in rate are accounted for in VBV buffer enforcement.

(9) The rate control algorithm also accounts for inverse telecine processing by the encoder when allocating bit budgets to particular frames. Inverse telecine processing involves detecting and skipping repeated fields in a field sequence outputted by a telecine machine to the encoder. In particular, the effective frame rate $f_{eff}$ is given by $$f_{eff} = (2/\overline{T}_i)f$$

where $\overline{T}_i$ is the average number of fields in a frame, and f is the nominal frame rate (as specified in a sequence header)

(10) The encoder can detect scene changes. The rate control algorithm is modified as a result of scene changes. In particular, a new GOP is started when a scene change is detected. Default values are used to allocate bits to the first I, P, and B frames in the new scene. The default value for the I frame depends on bit rate and VBV fullness and frame activity. The default values for the P and B frames are determined from the I frame default value. In addition, the initial quantization scale factor used in the first macroblock of the first frame of each type in the new scene is a function of the bit budget for the frame and the total activity of the particular frame. The total activity for a frame is the sum of the total activities for the macroblocks in the frame. The initial rate control quantizer scale factor for a frame of each type (I,P,B) is used to determine the initial occupancies of the corresponding virtual buffers $v_I, v_P, v_B$. These occupancies are then updated to obtain subsequent rate control quantization scale factors.

(11) The encoder can detect fades (fade to black or fade to white) and account for a fade in the rate control algorithm.

The MPEG-2 compliant encoding technique has several other important features useful for generating an MPEG-2 compliant bit stream.

(1) An inter/intra decision is made for each macroblock in a P or B frame. An intra-bias (IB) used in the decision takes into account the quantization scale factor for the macroblock.

(2) A motion vector is selected for each macroblock to be inter-coded. In the case of an interlaced sequence, it is desirable to pick between a frame-based motion vector and a plurality of field-based motion vectors. A three stage hierarchical procedure is provided to obtain a motion vector for each macroblock to be inter-coded.

(3) For each macroblock in a frame which utilizes frame based encoding, a decision is made whether to use field-or frame-based encoding (DCT, quantization, etc.). The present invention makes the field/frame encoding decision for each macroblock based on comparing (a) the total activity of the frame macroblock and the (b) sum of the total activities of the two field macroblocks. (A macroblock in an interlaced frame may be viewed as comprising macroblocks in each of the fields which comprise the frame. Each such field macroblock contributes half the rows to the frame macroblock.) The smaller of (a) and (b) determines which mode to use.

The above-described rate control technique may be used as part of a single pass real time constant bit rate encoding process.

C. Variable Bit Rate Encoding Rate Control

In some cases it may be desirable to use variable bit rate (VBR) encoding. In particular, it may be desirable to provide for non-real time variable bit rate encoding. Such encoding may utilize multiple encoding passes. The variable rate encoding of a sequence of frames (or pictures) proceeds as follows:

(1) In a first coding pass, VBV enforcement is disabled. In addition, in the first pass, the rate control quantization scale factor is maintained as fixed. However, the masking activity quantization scale factor is allowed to vary for different macroblocks.

(2) From step (1) a number of bits used to encode each frame in the input sequence in the first encoding pass is determined. Then, a bit budget for each frame in the sequence is determined from the number of bits used to encode each frame in the first pass such that (a) an overall target for the number of bits used to code the entire frame sequence is not exceeded, and (b) $R_{max}$, a maximum channel bit rate, is not violated. To accomplish this, the bit budget for each frame is modified so that the VBV buffer does not underflow. It is not necessary to worry about VBV overflow for a VBR encoder.

(3) The input sequence is then coded again in a second pass using the bit budgets determined in step (2). There is no VBV enforcement during the second encoding pass, as any possible VBV underflow has been accounted for as indicated in step (2). Instead, the cumulative coding budget deviation ($CE_i$) is maintained. This means that there is accumulated over the successive frames that are coded the difference between the bit budget, $BB_i$, for each frame and $BU_i$, the actual number of bits used to code the frame. Therefore, for frame i, $CE_i = CE_{i-1} + BU_i - BB_i$. The budget $BB_{i+1}$ for frame i+1 is modified by an amount proportional to the cumulative budget deviation $CE_i$. In the second pass, the rate control quantization scale factor is not necessarily fixed and may vary in response to virtual buffer fullness.

The foregoing variable bit rate technique may be modified by adding a zero pass (i.e. a pass prior to the first pass) in which the encoder performs scene detection, fade detection, and inverse telecine processing. In the zero pass, total activity and masking activity may be calculated for each macroblock. In addition, the first two stages of the three stage motion estimation hierarchy may be performed in the zero pass. This enables certain motion estimation statistics to be obtained which are useful for scene detection.

DETAILED DESCRIPTION OF THE INVENTION

Figure 1A:
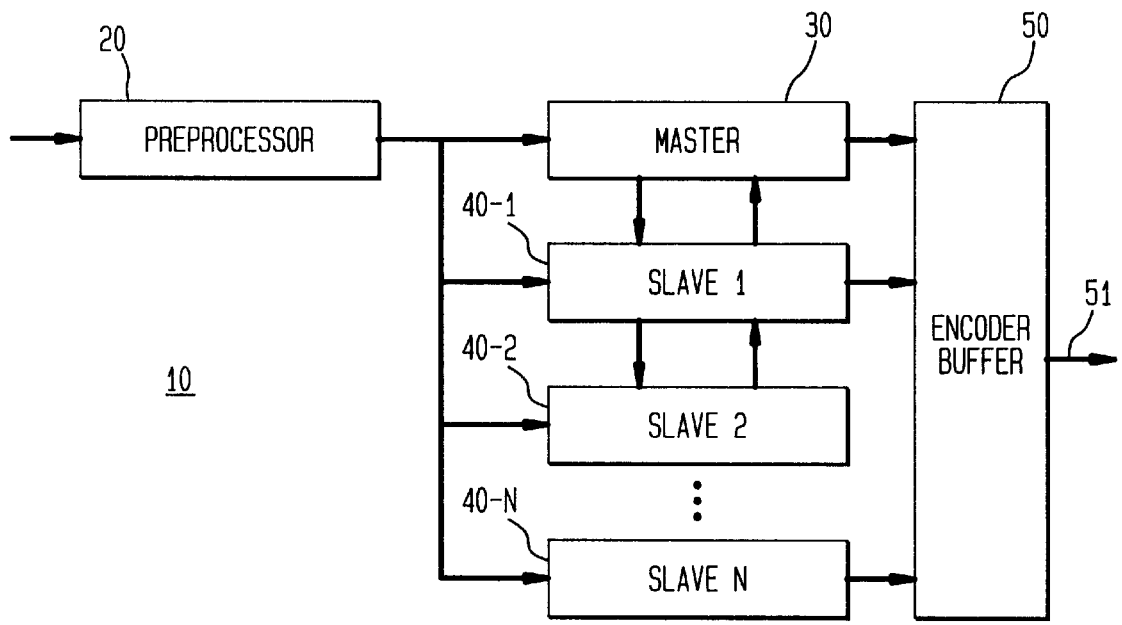
FIG. 1A schematically illustrates an architecture of an encoder which may be utilized to generate an MPEG-2 compliant bit stream, in accordance with the invention.

The following is an outline of the sections which appear in the Detailed Description of the Invention:

A. Encoder Architecture
B. Total Activity, Masking Activity
C. Quantization Biased, Activity Based, Inter/Intra Decision
D. Three Stage Hierarchial Motion Vector Determination
E. Field/Frame Macroblock Encoding Decision
F. Scene Detection
G. Fade Detection
H. Rate Control
   H.1 Bit Budget Determination
   H.2 Virtual Buffers for Determining Quantization Level
   H.3 Video Buffer Verifier
   H.4 VBV Underflow Protection and Panic
   H.5 VBV Overflow Protection
   H.6 Adaptive Quantization
   H.7 Statistical Multiplexing and Rate Changes
   H.8 Inverse Telecine Processing
I. Rate Control for Variable Bit Rate Encoder
J. Overall Encoder Rate Control Implementation A. Encoder Architecture An encoder which can carry out the inventive rate control and encoding algorithm of the present invention is illustrated in FIG. 1. The encoder 10 of FIG. 1 comprises a preprocessing unit 20, a master unit 30, and a plurality of slave units 40-1, 40-2, ..., 40-N. The encoder also includes a physical encoder output buffer 50 which is connected to a channel 51 for transmitting the encoded bit stream.

Figure 1B:
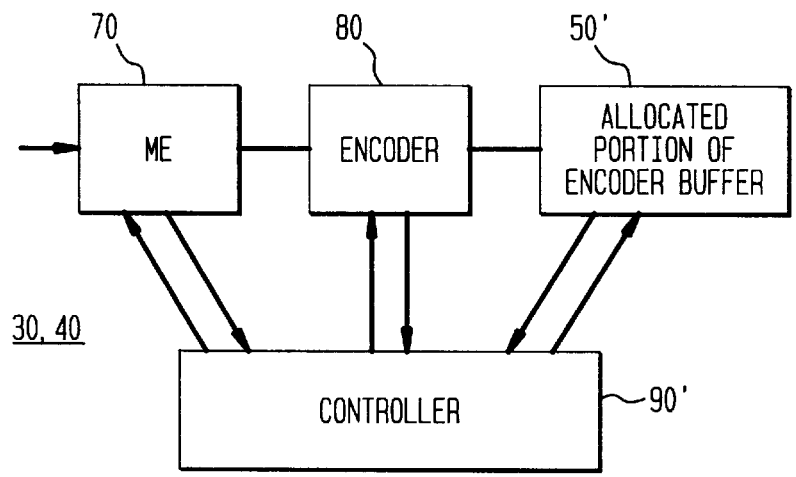
FIG. 1B illustrates a master or slave unit for use in the encoder of FIG. 1A.

The architecture of the master unit 30 and a slave unit 40 is illustrated schematically in FIG. 1B. Each unit 30,40 comprises a motion estimation unit 70 for determining motion vectors, an encoding unit 80 for performing DCT, quantization, run-level pair encoding, and variable length encoding. A portion 50' of the physical encoder buffer 50 is allocated to each master or slave unit 30,40. In addition, each unit 30,40 includes a controller 90 in communication with the motion estimation unit 70, encoder unit 80 and physical buffer 50. The controllers in the slave units operate under the control of the controller in the master unit.

In the preprocessing unit, the incoming video sequence is captured and buffered for reordering. The preprocessing unit determines a total activity and a masking activity for each macroblock in each frame in the input sequence. The total activity is used for buffer management and the masking activity is used for adaptive quantization.

Each unit (master 30 or slave 40) encodes a section of a frame. Each section illustratively comprises four rows of macroblocks. The motion vectors for the macroblocks in each section are determined by the motion estimation units in the corresponding master or slave unit. A three stage hierarchical motion estimation algorithm is used to find a motion vector. The first two stages of the three stage algorithm are run one frame in advance of actual encoding and may be done simultaneously with the activity calculations of the preprocessor.

Certain motion estimation results and the activities are provided to the controller in the master unit for scene change detection, fade detection and the like.

The rate control algorithm is carried out by the controller in the master together with the controllers in the slave units.

B. Total Activity, Masking Activity

The preprocessing unit of the inventive encoder determines two activity measures for each macroblock for each frame to be encoded.

Specifically, for each macroblock, there is determined a masking activity which measures the amount of local visual masking and a total activity which is used to determine the number of bits with which the macroblock is encoded.

For each block $b_k$ in the frame, a frame activity measure $fr_k$ is determined. In the case of interlaced video, half of the rows of the block are in one field and half of the rows are in the other field. Two field activity measures for the block $b_k$ are computed, where $fi1_k$ is the field activity of the portion of the block $b_k$ in the first field and $fi2_k$ is the field activity of the portion of the block $b_k$ in the second field. Illustratively, a macroblock is 16×16 pixels and a block is 8×8 pixels. In the case of interlaced video, each 8×8 pixel block $b_k$ comprises an 8×4 block in the first field and an 8×4 block in the second field.

Figure 2A:
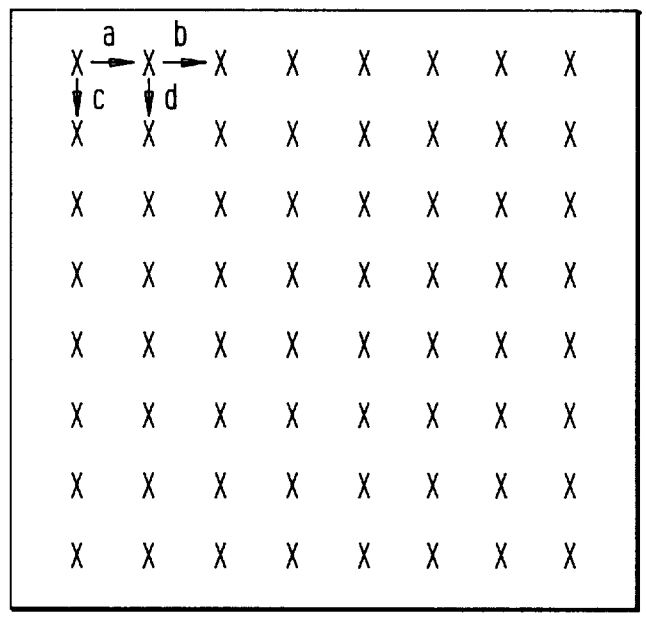
FIG. 2A illustrates a frame based macroblock.
Figure 2B:
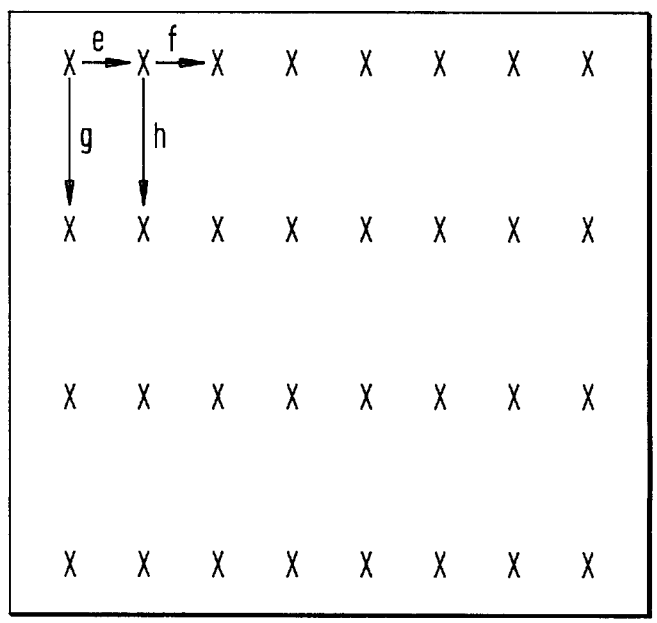
FIG. 2B illustrates a field based macroblock.

The frame activity or field activity for a block is determined by summing the absolute differences of horizontal pixel pairs and vertical pixel pairs. FIG. 2A shows an 8×8 block in a macroblock in a frame. The frame activity measure for this block is the sum of the absolute differences of all the horizontal pixel pairs (e.g. pair a and pair b) and the absolute differences of all the vertical pixel pairs (e.g. pair c and pair d). FIG. 2B shows a block in one of the fields that comprise the frame. This "field block" is 8×4 pixels as alternate rows of pixels are in the other field. The field activity measure for this block is the sum of the absolute differences of all the horizontal pixel pairs (e.g pair e and pair f) and the absolute differences of all the vertical pixel pairs (e.g. pair g and pair h).

Then for each macroblock n in the frame, there is computed the total activity $ta_n$ and the masking activity $ma_n$, where $$ta_n = \min\left( \sum_{b_k \in n} fr_k, \sum_{b_k \in n} fi1_k + \sum_{b_k \in n} fi2_k \right)$$

The minimum is over 12 luma blocks, 4 that comprise the macroblock n and 8 surrounding blocks.

A total activity $TA_i$, for a frame i may be obtained by summing the total activities for all the macroblocks in a frame.

C. Quantization Biased, Activity Biased, Inter/Intra Decision

The inter/intra decision is the decision between coding a macroblock in a P or B frame with prediction from a reference frame (inter-coding) or without prediction (intra-coding). The decision is taken to give the most effective encoding (best quality). In the inventive technique, the decision is biased against intracoding as the quantization scale factor $Q_n$ increases for the macroblock n.

The total activity $ta_n$ of a macroblock n has been defined above. This activity is a measure of the intra-activity ($IA_n$) of the macroblock.

The displaced frame difference activity (DFDA) is the total activity (calculated in the manner described above in section B) of the macroblock of pixel error values resulting from subtracting the motion compensationed prediction of a macroblock from the macroblock to be encoded.

The Intra-bias (IB) of a macroblock to be encoded is for example given by $$IB_n = f(Q_n, IA_n) = (Q_{n \times IAn})/\text{constant}$$

where, $Q_n$ is the quantization scale factor to be used to code the macroblock.

The inter/intra decision for the macroblock n is determined as follows:

If $IA_n$<threshold, use intra-coding.

If $DFDA_n > IA_n + IB_n$, use intra-coding.

Otherwise, use inter-coding

Figure 3:
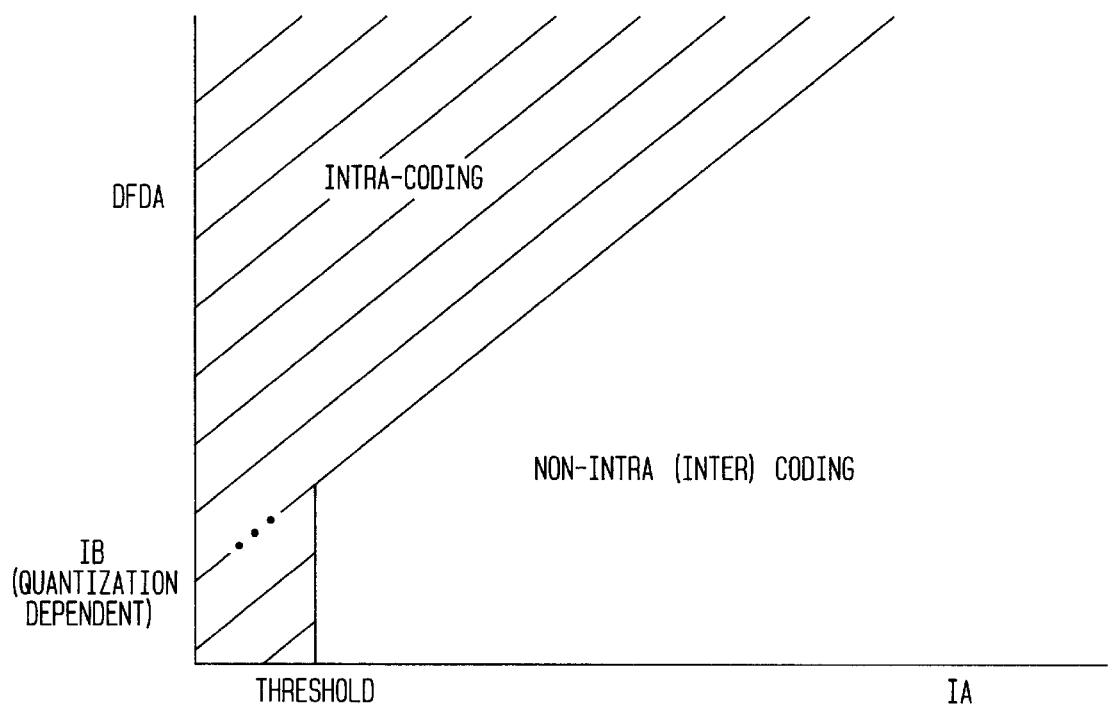
FIG. 3 is a plot which indicates how an inter/intra coding decision for a macroblock is to be made.

FIG. 3 plots IA on the horizontal axis and DFDA on the vertical axis. The shaded region is the region for which intra-coding is to be used.

Note from FIG. 3A that the bias $IB_n$ works against intra coding as $Q_n$ increases. This is an important feature of the inventive inter/intra decision algorithm. The reason is as follows. If a macroblock is to be coded with a high quantization step size (as determined by the rate control algorithm and the visual content of the block), its representation when coded intra will be poor, while the inter representation will be better.

D. Three Stage Hierarchial Motion Vector Determination

In the case of an interlaced sequence, a three stage hierarchical motion estimation algorithm is utilized to obtain a motion vector. The first two stages are performed while the previous frame is being encoded.

A motion vector is a two dimensional vector used for motion compensation that provides an offset from the coordinate position in the current frame or field to the coordinates in a reference frame or reference field.

Figure 4A:
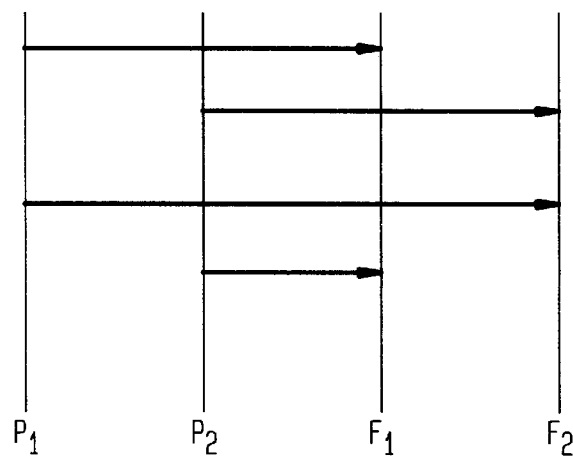
FIG. 4A illustrates field based motion vectors.

Consider a macroblock in a frame F to be encoded. This macroblock has two fields designated $F_1$ and $F_2$. Consider a reference frame P from which a predictive macroblock is to be obtained. The reference frame has two fields designated $P_1$ and $P_2$. The fields $F_1$, $F_2$, $P_1$, $P_2$ are shown in FIG. 4A. There are four possible field-based motion vectors, $P1 \rightarrow F_1$, $P_2 \rightarrow F_2$, $P_1 \rightarrow F_2$, $P_2 \rightarrow F_1$ and one possible frame-based motion vector. The field based motion vectors are also shown in FIG. 4A.

The three stage hierarchy for obtaining the motion vector is explained in connection with the flowchart FIG. 4B.

Figure 4B:
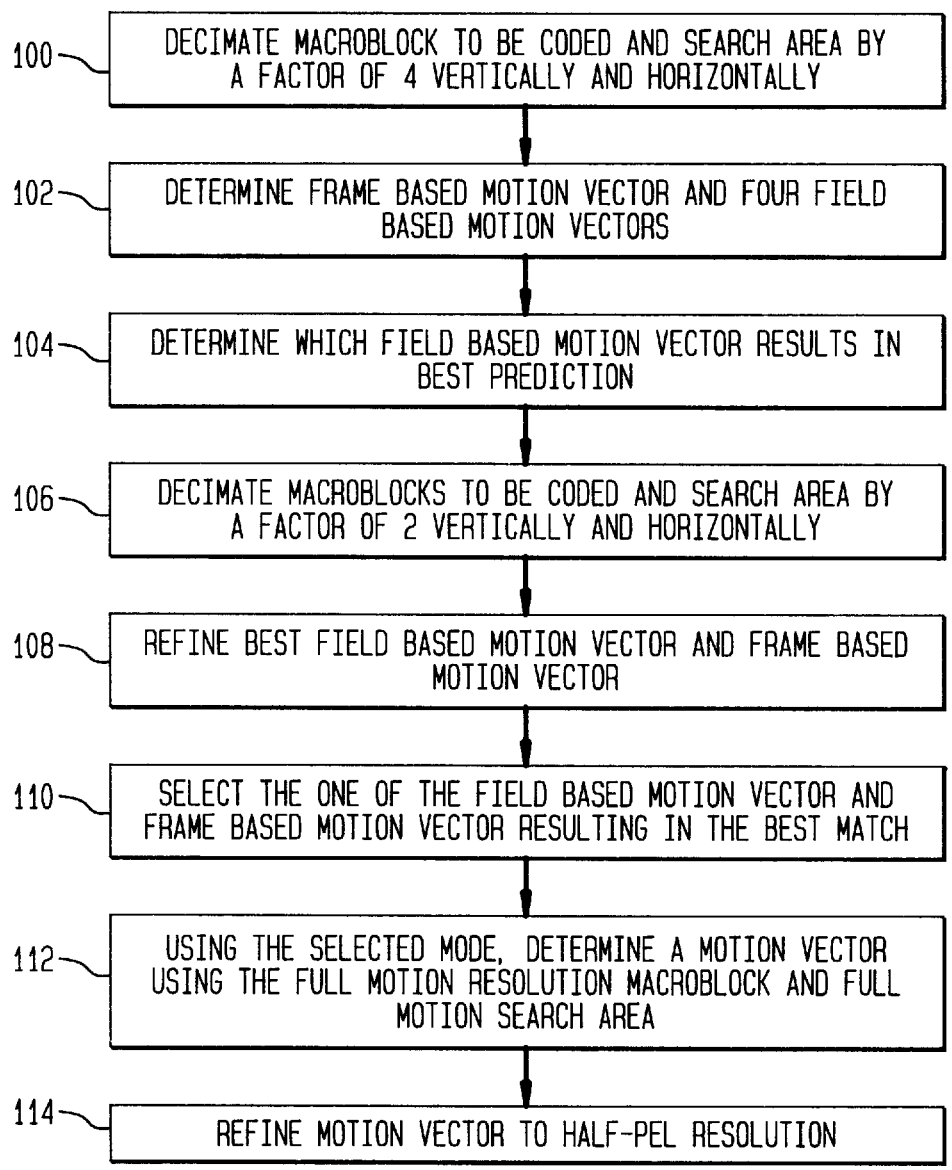
FIG. 4B is a flow chart for a three stage hierarchical motion estimation algorithm.

In the first stage of the three stage hierarchy, the macroblock to be encoded is decimated by a factor of four horizontally and by a factor of four vertically (step 100 of FIG. 4B). This results in a macroblock which comprises 4×4 pixels, so that there is a 4×2 macroblock in Field $F_1$ and 4×2 macroblock in field $F_2$. A search area in the frame P is similarly decimated.

Typically, a 4×4 decimated frame macroblock and a 4×2 decimated field macroblock are sufficiently small targets that a block matching algorithm for finding a best match within a search area may not work properly. Accordingly, to obtain a motion vector in this first stage of the three stage hierarchy, a pair of adjacent 4×4 decimated frame macroblocks are grouped together to form a target for obtaining a frame based motion vector. Similarly, four 4×2 decimated field macroblocks are grouped together (into an 8×4 macroblock set) to form a target for obtaining the field based motion vectors.

Then the four possible field-based motion vectors and the frame-based motion vector are determined for each decimated macroblock and decimated search area (step 102). Numerous block matching techniques are available for finding a motion vector between a macroblock (or set of macroblocks) of pixels in a current frame or field and a search area in a previous frame or field. The frame-based motion vector and field-based motion vector resulting in the best prediction are retained (step 104).

In the second stage of the hierarchy, the macroblock to be encoded is decimated by a factor of two in the horizontal direction and a factor of two in the vertical direction (step 106). This results in an 8×8 macroblock comprising an 8×4 macroblock in Field $F_1$ and an 8×4 macroblock in Field $F_2$. The search area in the reference frame is also decimated by a factor of two horizontally and a factor of two vertically (step 106). The selected field-based motion vector and the frame-based motion vector are refined (step 108). The one of the two refined motion vectors which results in the best prediction is then selected (step 110). This determines which mode is used to obtain the final motion vector for the macroblock. The mode will either be a frame-based motion vector or the selected one of the four possible field-based motion vectors, depending on the results of stage 1 and stage 2.

In the third stage of the hierarchy, the motion vector is obtained using the selected mode (step 112). The full resolution macroblock and full resolution search area in the reference frame are utilized. This motion vector is then refined to half-pixel resolution.

It should be noted that it might be necessary to compute several motion vectors for a macroblock to be encoded using this procedure. For example, in the case of a macroblock in a B frame, it may be necessary to determine a motion vector for forward prediction, a motion vector for backward prediction and an interpolated motion vector. The decision to use forward prediction, backward prediction or interpolated prediction is made based on the motion vectors obtained after stage 3 of the hierarchy.

E. Field/Frame Macroblock Encoding Decision

For a frame in an interlaced sequence, each field may be coded separately or frame-based coding may be utilized. It may be preferable to use frame based encoding because it is more flexible.

If frame-based encoding is chosen, for each macroblock of pixels (in the case of an I macroblock) or each macroblock of predictive errors (in the case of P or B macroblocks) the encoding (DCT, quantization, zig-zag scanning, run-level pair encoding, variable length encoding) may be field-based or frame-based.

For the macroblock n, the following is determined:

$$\text{if} \left( \sum_{b_k \in n} fr_k < \sum_{b_k \in n} fr1_k + \sum_{b_k \in n} fr2_k \right)$$

use frame encoding, otherwise use field encoding for the macroblock n.

F. Scene Change Detection

In the inventive encoding method, scene changes are detected by the controller in the master unit. Scene changes are detected as follows:

1. The controller in the master unit maintains an average total activity $TA_i$ for the frames of a scene.
2. The controller in the master unit maintains a deviation from average total activity of $TA_i$ for the frames in a scene.
3. The controller in the master unit maintains an average motion estimation score for the frames in a scene and a deviation from average. The motion estimation score of a macroblock is, for example, a sum of the absolute differences of the pixels in the macroblock and the corresponding pixels in the prediction of the macroblock in the reference frame. The motion estimation score of a frame is the sum of the motion estimation scores of the macroblocks in the frame. The predication may be the prediction obtained in stage one of the three stage motion vector determination.
4. If the deviation from average of $TA_i$ in a particular frame and the deviation from average of the motion estimation score in the particular frame exceed their expected deviations by a threshold factor (e.g., a factor of 10), a scene change is detected.

Figure 5:
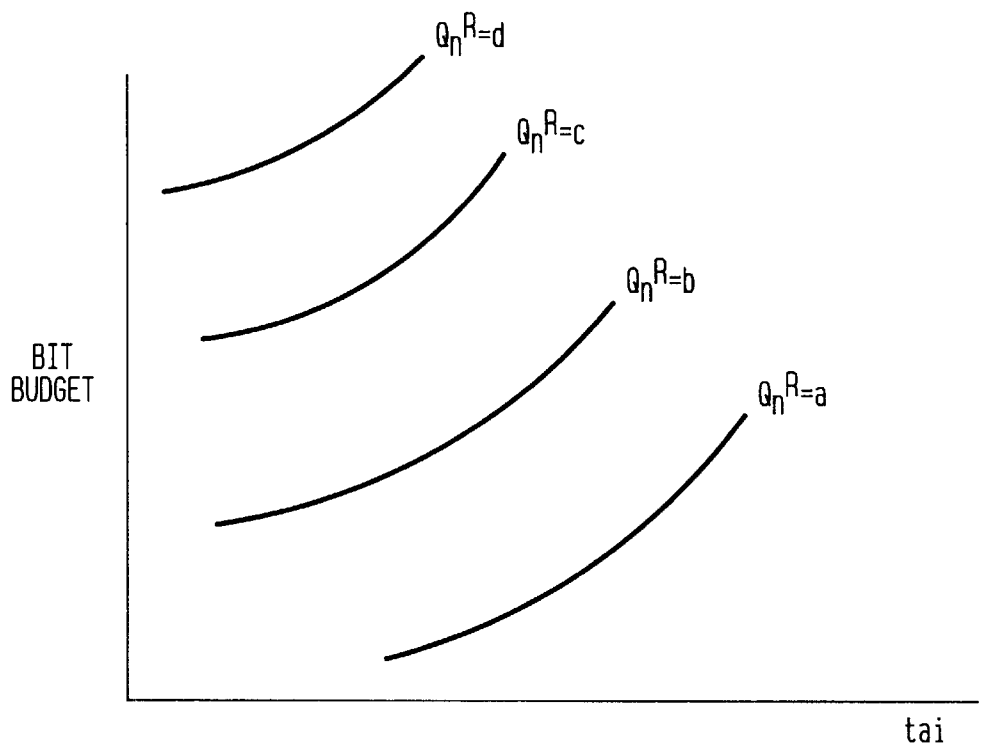
FIG. 5 illustrates the dependence of a rate control quantization scale factor for a macroblock on total activity and bit budget after a scene change is detected.

When a scene change is detected the following steps are taken:

1. A new GOP is started.
2. Default values are used to establish budgets for I, P and B frames rather than basing the budgets on the previously coded frame of the same type (see Section H below). The budget are established so that the budget for an I-frame is twice the budget for a P frame and four time the budget for a B frame. The budget for the I frame is determined from factors such as intra-activity and VBV occupancy.
3. After the second reference frame of the new GOP is encoded (usually a P frame), rate control variables are scaled using the first frame result.
4. The average of $TA_i$ is set to the value of $TA_i$ for this first frame. The $TA_i$ variance is set to difference between the value of $TA_i$ of this first frame and the average of the previous scene. Similarly, the average of motion estimation score is set to the motion estimation score for this first frame. The motion estimation variance is set to the difference between the motion estimation score of this first frame and the average of the previous scene.
5. The rate control quantization scale factor $Q_n^R$ for an initial macroblock in the first frame of each type (I, P, B) in the new scene is a function of $TA_i$ and the bit budget for the frame, i.e., $Q_n^R = f(\text{bit budget}, TA_i)$. The values of this function are stored in a table and may be accessed by the master and slave controllers. In general, this rate control quantization scale factor varies inversely with the bit budget and directly with the total frame activity. Sample, values of the function f(bit budget, $TA_i$) are plotted in FIG. 5. Once an initial value of $Q_n^R$ is determined for I,P and B frames according to f(bit budget,$TA_i$), it is possible to determine initial occupancies for the corresponding virtual buffers $v_I, v_P, v_B$. These occupancies are then updated to obtain subsequent rate control quantization scale factors.

G. Fade Detection

A fade takes place when the DC value of the luminance of a scene varies smoothly with frame number from a particular value until the DC luminance value for black is reached or the DC luminance value for white is reached.

Figure 6:
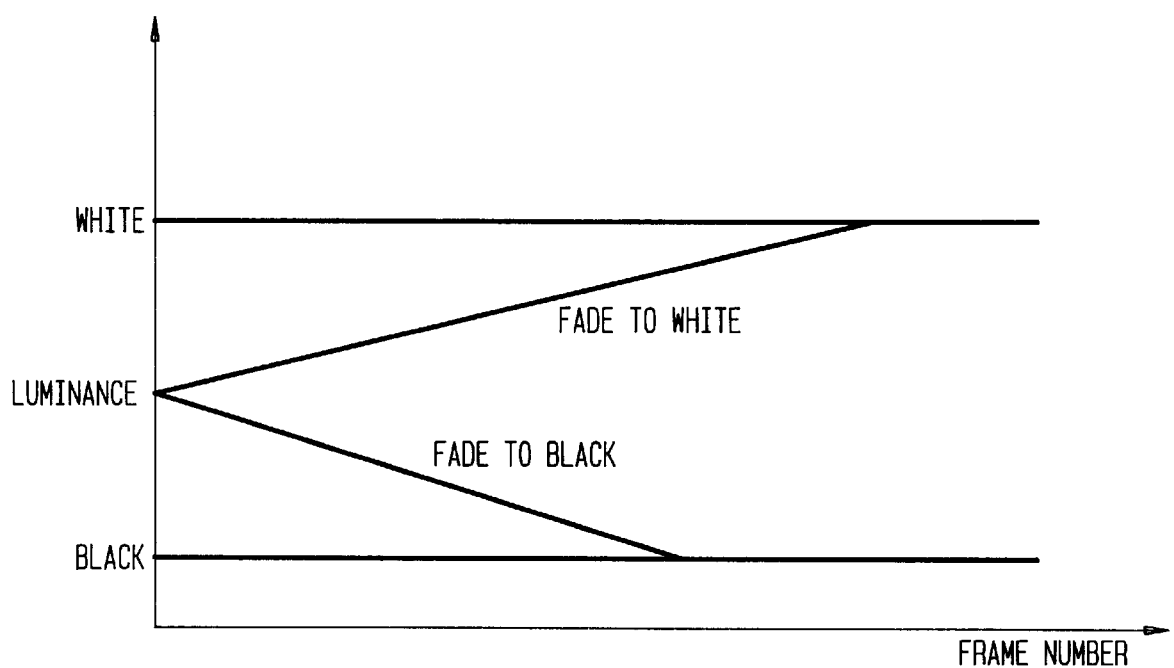
FIG. 6 illustrates a fade to black and a fade to white.

FIG. 6 illustrates the DC luminance value as a function of frame number for a fade to white and for a fade to black.

The preprocessor compares the DC values of successive frames to detect a fade. (Instead of the DC value, activity measures for successive frames may be compared to detect the fade).

The preprocessor sends an indication of a fade to the controller in the master unit of the encoder. The controller uses the information to determine the sequence of I, P. and B frames. In general, B frames do not work well in the presence of a fade and result in a large number of bits. In general, P frames with motion vectors at or near zero are utilized or else I frames are utilized. Preferably, a reduced search range is used to find the motion vector. In the case a B frame is utilized, instead a receiving the normal budget $BB_B$ for a B frame, the frame receives $BB_p$ the normal budget for a P frame (see Section H below).

H. Rate Control

H.1 Bit Budget Determination

Let R be the channel bit rate (bits/second) as specified in the sequence header, and f be the nominal frame rate (frames/second) specified in the sequence header. The effective coding rate $R_{\text{eff}}$ will vary over time from R when statistical multiplexing causes a plurality of encoders to share the channel rate R and/or variable bit rate (VBR) coding is used. Similarly, the effective frame rate $f_{\text{eff}}$ may vary from the nominal frame rate f such as under inverse telecine processing. The value $f_{\text{eff}}$ is considered to be a windowed time average.

Let $K_I$, $K_P$, and $K_B$ be the number of intra, predicted, and bidirectional frames per second ($K_I+K_P+K_B=f_{\text{eff}}$) These numbers depend on the group of pictures (GOP) structure and coding bit rate, and therefore vary with $f_{\text{eff}}$ or changing GOP structure.

Let $S_j$ and $\overline{Q}_j$ be the number of bits and average quantization scale factor used for coding the most recent frame of type j. Then $BB_i$, the bit budget for frame i is given by $$BB_i = (S_i \cdot \overline{Q}_j \cdot R_{\text{eff}}) / \left( \sum_{j=I,P,B} K_j S_j \overline{Q}_j \right) \tag{1}$$

Constant bit rate (CBR) rate control is achieved through a feedback mechanism by monitoring bit spending and appropriately adjusting the quantization stepsize. For P and B pictures, the frame budget $BB_i$ is first distributed among the sections such that section k gets a bit budget $BB_i^{(k)}$:

$$BB_i^{(k)} = C_i^{(k)} BB_i / \sum_{j=0,M} C_i^{(j)} \tag{2}$$

where M is the number of sections, and $C_i^{(k)}$ is the complexity measure for section k for frame type i, computed as follows:

$$C_i^{(k)} = \sum_{n=1,N_k} Q_n^R \cdot s_n \tag{3}$$

where $N_k$ is the number of macroblocks coded by section k, $Q_n^R$ is the rate control quantization scale factor for macroblock n, and $s_n$ is the number of bits used for coding macroblock n. Note that the complexity measure used in Equation (2) and Equation (3) corresponds to the most recent frame of the same type.

Each slave unit (see FIG. 1) then distributes its budget among its macroblocks proportional to the total activity measure $ta_n$ of each macroblock n. In intra pictures, and in P and B pictures following a scene change, the bit budget is distributed among sections proportional to the total intra activity of each section. The total activity of a section is a sum of the total activities of the macroblocks in the section.

H.2 Virtual Buffers for Determining Quantization Level

Virtual buffers $v_I$, $V_P$ and $v_B$ (corresponding to frame types I, B, and P) provide rate control feedback by adjusting the rate control quantization scale factor. The virtual buffers provide a mechanism to relate the number of bits allocated to a macroblock and the quantization scale factor selected for that macroblock. The rate control quantization scale factor $Q_n^R$ for a macroblock n in a frame of type j is determined by the ratio of virtual buffer fullness (denoted $vbf_j$) to virtual buffer size (denoted $vbs_j$) in the following way:

$$Q_n = QS_n \cdot f(vbf_j/vbs_j) \quad (4)$$

where $f(x)=Q_n^R$ is a smooth function that returns the minimum rate control quantization scale factor value $Q_n^R$ for x<0, and the maximum rate control quantization scale factor value $Q_n^R$ for $x \geq 1$. The function $f(x)$ is implemented as a table with 256 entries. Two such tables, one for linear (i.e., MPEG-1), and for non-linear quantization may be provided. The $QS_n$ factor is an additional quantization scale factor based on the masking activity (see Section H.6 below.)

H.3 Video Buffer Verifier (VBV)

All MPEG-2 bit streams are required to comply with the Video Buffer Verifier (VBV) rules described in the MPEG-2 standard. The VBV buffer is a virtual buffer which is maintained by the controller in the master unit. The VBV buffer is a model of the input buffer at the decoder. The encoder allocates bits to frames such that the VBV buffer does not overflow or underflow in the case of constant bit rate encoding (In the case of variable bit rate encoding, it is only necessary to prevent VBV underflow). The MPEG-2 standard specifies the manner in which bits are placed into and removed from the VBV buffer.

Specifically, the removal of the bits from the VBV buffer is instantaneous (implying that the decoder decodes the picture instantaneously). In this respect, all realizable decoder buffers deviate from the hypothetical VBV decoder buffer.

Apart from this instantaneous decoding model, the encoder's physical buffer is a mirror image of the VBV buffer: a VBV underflow implies an encoder physical buffer overflow, i.e., too many bits generated at the encoder.

The VBV has a receiving buffer of size B bits. The fullness of the VBV buffer at any time is denoted by d (or by $d^{(i)}$ after picture i has been removed from the buffer). The physical encoder buffer (with fullness denoted by P) differs from the VBV buffer in that it is filled at a rate similar to the VBV buffer, however after each macroblock n is encoded, the bits spent to encode the macroblock $S_n$, are removed from the VBV buffer. Therefore, the two buffers have the same occupancy after a picture has been removed from the VBV buffer.

H.4 VBV Underflow Protection

There are two levels of actions taken to prevent VBV underflow. After the number of bits used by the previous picture is known, the bit budget for the current picture is reduced if necessary so as to fit in the VBV buffer, i.e.

$$d + R_{eff}/f_{eff} - BB > 0 \quad (5)$$

The second level of action takes place at the macroblock level, where the rate control initiates what is called the panic mode.

During encoding, a scene can be encountered which generates too many bits, even when the quantization scale factor is set to the maximum value. The encoder is in danger of generating too many bits for the channel to transfer to the decoder and causing a "VBV underflow" bitstream error. In this case, the encoder enters the "panic" mode in which quality is sacrificed to guarantee a legal bit stream.

The panic trigger mechanism is related to the encoder model of decoder buffer fullness (i.e. the VBV buffer). The encoder updates its model of decoder buffer fullness as each macroblock is encoded by subtracting the bits utilized to code the macroblock. The VBV is also updated by adding the bits transferred by the constant bit rate channel.

At the last macroblock in a frame, the encoder needs to ensure that the number of bits generated for the rest of the frame is at or below a relatively small level to ensure that there will be no VBV underflow during the rest of the frame. At the beginning of the frame, the encoder needs to ensure that the actual number of bits generated is below a much larger level to prevent VBV buffer underflow during the rest of the frame. In the panic mode, to ensure that there is no VBV buffer underflow, all non-intra macroblocks are of type not coded, i.e. they have no coded block patterns. This means that the predictive error macroblocks are hot coded. Intra macroblocks have a DC and a small (programmable) number of AC discrete cosine transform coefficients. Furthermore, the intra-bias (see section C above) is increased to favor non-intra macroblocks.

The condition as to when to start the panic mode is now more carefully considered. Let K be the number of macroblocks in a picture, and let $N_{max}$ be the estimate of maximum number of bits generated per macroblock when in panic mode (this will be general depend on the current picture type and how many AC coefficients are retained for intra macroblocks). Let k be the number of macroblocks remaining in the current frame. Clearly, we need $k \cdot N_{max}$ bits remaining in the VBV buffer to be able to handle the worst case. On the other hand, the VBV buffer is filled at a rate of $R_{eff}/(f_{eff}K)$ bits per macroblock. Therefore, the "optimal" strategy is to enter panic mode when the physical buffer has less than $k(N_{max}-R_{eff}/(f_{eff}K))$ bits with k macroblocks remaining to encode. This is implemented as follows:

Prior to encoding, the physical buffer fullness $P_o$ is set to the VBV buffer fullness d. Then, $P_n$ is updated for the macroblock in a frame as:

$$P_n = P_{n-1} - S_{n-1} + R_{eff}/(f_{eff}K) \quad (6)$$

The panic mode is enabled as long as $P_n \leq (K-n) \cdot N\max$.

As indicated above, the quantization step size is a product of a weighting matrix W[v][u] and a quantization scale factor $Q_n$ (known also as mquant in the MPEG-2 standard). There are 31 possible ($Q_n$). (W[v][u]) matrices in accordance with MPEG-2. Illustratively, these matrices are all stored at the encoder. In addition, one or more panic matrices may be stored. For example, in the panic mode, if it is desirable to encode only the DC transform coefficient, the transform coefficients F[v][u] may be multiplied by an element from a panic matrix $p_0$[v][u], whose only non-zero value is $p_0$[0][0]. If the panic is less severe, a different panic matrix $p_1$[v][u] may be utilized which has a few AC non-zero values in addition to the DC non-zero value. This permits the intrablocks to be coded with a DC coefficient and a few non-zero AC coefficients. In general, a plurality of panic matrices may be stored at the encoder with different numbers of non-zero AC coefficients. Depending on the severity of the panic, a particular panic matrix with a particular number of non-zero AC coefficients is selected.

H.5 VBV Overflow Protection

VBV overflow implies that the encoder is not generating enough bits to keep the physical encoder buffer from emptying. The solution is to produce the right number of stuffing bits. The stuffing can be done at the picture level (called zero stuffing), or at the macroblock level (called macroblock stuffing). MPEG-2 disallows macroblock stuffing.

Similar to underflow protection, the action is taken at two levels. The bit budget $BB_i$ of frame i is increased if necessary so that $$d+R_{eff}/f_{eff}-BB_i \leq B-R_{eff}/f_{eff} \qquad (7)$$

where B is the size of the VBV.

Zero stuffing is done by the master unit controller after a picture is coded. If $$d > B-R_{eff}/f_{eff}+\text{safety margin} \qquad (8)$$

then zero bytes are stuffed to bring the occupancy to this level. The safety margin is provided to take care of bit rate, fluctuations, i.e. a mismatch between the encoder and channel clocks.

H.6 Adaptive Quantization

The masking activity quantization scale factor for a macroblock i is given by $$QS_n = [\alpha(ma_n+k_1)+\overline{ma}/[ma_n+\alpha(\overline{ma_n}+k_1)]$$

where $\overline{ma}$ is the average masking activity over the entire picture and $\alpha$ is 4, and where $k_1$ is a constant to correct for the case where $ma_n$ is small. Illustratively, $k_1$ is 5% to 10% of $\overline{ma}$. The final quantization scale factor $Q_n$ (also known as mquant) used to encode a macroblock is $$Q_n = (QS_n) \cdot (Q_n^R) \qquad (10)$$

where $Q_n^R$ is the rate control quantization scale factor.

H.7 Statistical Multiplexing and Rate Changes

The rate control technique described above for allocating bits to frames depends on the effective bit rate $R_{eff}$. More specifically, the bit budget $BB_i$ provided for each frame depends on the effective bit rate $R_{eff}$. In addition, VBV enforcement to prevent VBV overflow or underflow depends on the rate $R_{eff}$.

The rate $R_{eff}$ may change under a variety of circumstances.

For example, a plurality of constant bit rate encoders may share a channel. A statistical multiplexer controller allocates a portion of the channel bandwidth to each encoder. At various times, the portion of channel bandwidth allocated to a particular encoder may change. Alternatively, in a case of a variable bit rate encoder, the bit rate used to encode the bit stream may change from time to time. This rate change has to be accounted for in the rate control algorithm.

(a) Introduction

A statistical multiplexing system consists of N variable bitrate streams sharing a channel with constant capacity R (called bundle rate). Let $R_{eff}^i$ denote the bitrate at which the stream i is being served at time t. Then, the following must hold for all t.

$$\sum_{j=1}^{N} R_{eff}^j(t) = R$$

The allocation of R among the N channels is done to minimize an overall cost function, and is dynamic in general. The following questions summarize the issues faced in the design of a statistical multiplexing system:

1. What is the "best" distortion measure? (Distortion refers to the difference between a coded picture and the actual picture, it is the opposite of quality.)
2. What is the optimal allocation of rates that minimizes the distortion measure?
3. How does one achieve the optimal allocation given an initial allocation?

It should be noted that the optimal allocation of bits depends on this cost function. Let $d_i(t)$ be the distortion of stream i at time t. Then two popular choices for the cost function are "minimum total distortion": and "minimax distortion". In the former case, one minimizes $$J = \sum_{i=1}^{N} d_i$$

which requires the locate rate-distortion functions for each stream to be known. In the latter case, the function $$J = \max d_i$$

has a much simpler solution, since it is clearly minimized when all distortions are equal. This cost function will be assumed in the following discussion, although any cost function may be accommodated in general.

Section (b) focuses on the allowable range of rates for a given stream. Section (c) proposes a statistical multiplexing system that converges to the desired optimal allocation in several steps.

Figure 7:
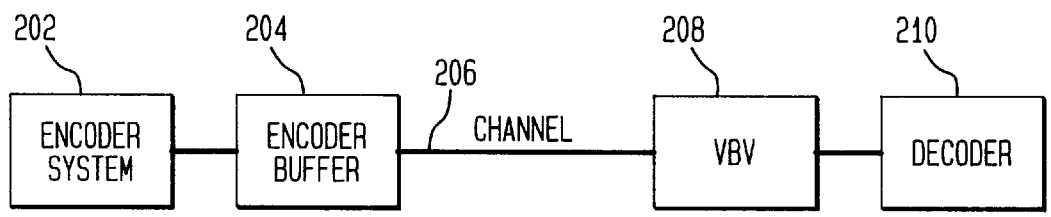
FIG. 7 illustrates an end-to-end encoder and decoder system.

Consider the end-to-end system illustrated in FIG. 7. The end-to-end system 200 comprises the encoder system 202 (including preprocessor, master unit and one or more slave units), a physical encoder buffer 204, a channel 206, a decoder input buffer 208, and a decoder 210. The decoder buffer 208 is modeled at the encoder by the VBV buffer, thus the decoder input buffer 208 is labeled VBV.

(b) Constraints for Rate Change

The rate change has to ensure the following:

1. The decoder buffer cannot overflow or underflow.
2. The encoder buffer cannot overflow.
3. End-to-end system delay must be constant.

Here we assume that the channel has some means (such as null packet insertion) to handle the case of encoder buffer underflow. When the encoder buffer is appropriately sized, the second condition is automatically satisfied when the end-to-end delay constraint is met. The proper size for the encoder buffer is $\Delta/R_{eff,max}$ where $\Delta$ is the desired end to end delay, and $R_{eff,max}$ is the maximum allowable channel rate. Note that this is the abstract encoder buffer size, and the physical buffer has to be larger to allow for encoding delays, inverse 3:2 pulldown, etc.

Let the channel rate at time t be R(t), the encoder buffer fullness E(t), and the decoder buffer fullness D(t). The end-to-end system delay A has two components: encoder buffer delay $\Delta_e$, and decoder buffer delay $\Delta_d$. The former is proportional to the encoder buffer occupancy, and inversely proportional to the bitrate, i.e., $$\Delta_e(t) = E(t)/R_{eff}(t)$$

The decoder buffer delay is of course $\Delta - \Delta_e(t)$, as it serves to remove the jitter introduced by the encoder buffer. Notice that a step change in the bitrate causes a step change in the encoder delay, and this has to be absorbed by the decoder buffer.

(b)(1) The Perfect Case

In this section, we assume an encoder that can encode a frame instantly, i.e., with no delay. Furthermore, we assume that the statistical multiplexing control announces the rate changes in advance.

Assume the rate is $R_{eff,0}$ for $t<T_1$, it changes to $R_{eff,1}$. In that case, $E(T_1)$ bits were put in the encoder buffer while the rate was $R_{eff,0}$, and drained at a different rate, $R_{eff,1}$. If the encoder is notified about the rate change in advance, it can start outputting bits at the correct rate before the rate change occurs at the channel.

How much advance notice does the encode require? It needs to be notified early enough that all the bits currently in the buffer can be emptied at the current rate. Let the encoder be notified $\delta$ seconds before $T_1$, the time at which the channel rate changes. Then, the encoder buffer cannot contain more than $R_{eff,0}$ $\delta$ bits, as this is the number of bits that will be drained before the rate change. Therefore, the advance notice is the smallest $\delta$ that satisfies $$E(T_1-\delta)/R_{eff,0} \leq \delta$$

(b)(2) Instant Encoding, No Advance Notice

Now let us consider a more realistic case, where the channel rate changes with no advance notice. What are the largest and smallest bitrates that can be accommodated in terms of encoder and decoder buffer fullness?

First, assume that the new rate $R_{eff,1}$ is greater than $R_{eff,0}$. Then, there exists the possibility that this unforeseen rate change will overflow the decoder buffer, and/or underflow the encoder buffer.

At the time of the rate change, the encoder has $E(T_1)$ bits, which would have taken $d_0$ seconds to drain, where $d_0 = E(T_1)/R_{eff,1}$.

At the new rate, it takes $d_1 = E(T_1)/R_{eff,1}$ seconds to drain. This causes a step increase in the decoder buffer fullness by the amount of $d_1(R_{eff,1}-R_{eff,0})$. From then on, the encoder can adjust the coding bitrate to avoid a decoder buffer overflow. At the maximum allowable rate $R_{eff,1}{}^*$, the decoder buffer reaches its maximum fullness.

$$E(T_1)/[R_{eff,1}{}^* - (R_{eff,1}{}^* - R_{eff,0})] = D_{max} - D(T_1)$$

Or, the maximum rate change that can be tolerated by the decoder at time $T_1$ is no smaller than $$R_{eff,1}{}^* = \frac{E(T_1) \cdot R_{eff,0}}{E(T_1) - (D_{max} - D)}$$

Notice that the $R_{eff,1}{}^*$ we have computed is not necessarily the largest rate that can be accommodated. However, it is a lower bound for the largest allowable bitrate. This is because we have considered the worst case, where no bits are removed from the decoder buffer during time $d_1$. In general, $d_1$ may be many picture periods, and the bits corresponding to these pictures will be removed from the decoder buffer as the pictures are decoded. Then, it is possible to calculate a tighter lower bound for $R_{eff,1}{}^*$ by considering each picture decoding period until $d_1$.

Now, let us consider the case where the new rate $R_{eff,1}$ is less than $R_{eff,0}$. Then, one or both of the following may take place:

1. The encoder buffer may overflow, causing loss of data.
2. The decoder buffer may underflow, thereby violating the end-to-end delay constraint.

The first condition is avoidable by appropriately sizing the encoder buffer, and will not be considered. (In other words, the encoder buffer is sized such that the decoder buffer underflows before the encoder buffer overflows).

Analogous to the previous analysis, let $d_1 = E(T_1)/R_{eff,1}$. It is clear that the end-to-end delay constraint will be violated if the decoder is allowed to underflow. In other words, when the decoder buffer underflows, the encoder delay is at least as large as the end-to-end system delay. Therefore, the minimum rate $\overline{R}_{eff,1}$ is given by $$\overline{R}_{eff,1} \geq \frac{E(T_1)}{\Delta}$$

Note that the above equation can be arrived at by looking at the end-to-end delay constraint. Recall that the total delay is the sum of encoder buffer delay and decoder buffer delay. The rate change causes a step change in the encoder buffer delay. Then, the decoder buffer delay must be able to accommodate this change, i.e, is should be at least as large as the change in the encoder delay:

$$\Delta_d = \Delta - \Delta_e \geq \text{change in } \Delta_e$$

$$\Delta - \frac{E(T_1)}{R_{eff,0}} \geq \frac{E(T_1)}{R_{eff,1}} - \frac{E(T_1)}{R_{eff,0}}$$

$$\Delta \geq \frac{E(T_1)}{R_{eff,1}}$$

(c) Statistical Multiplexing Control

Given an optimal rate allocation among the streams, and rate constraints for each stream, how de we apply this to a statistical multiplexing system. We consider a typical scenario of N encoders communicating with a central control unit. Illustratively, consider that all encoders are frame synchronized. This does not lead to a loss of generality, since the encoders can be frame synchronized by addition of appropriate amounts of delay. The presence of inverse telecine adds a field delay when a field is dropped, but this can also be handled in a similar fashion.

Figure 7A:
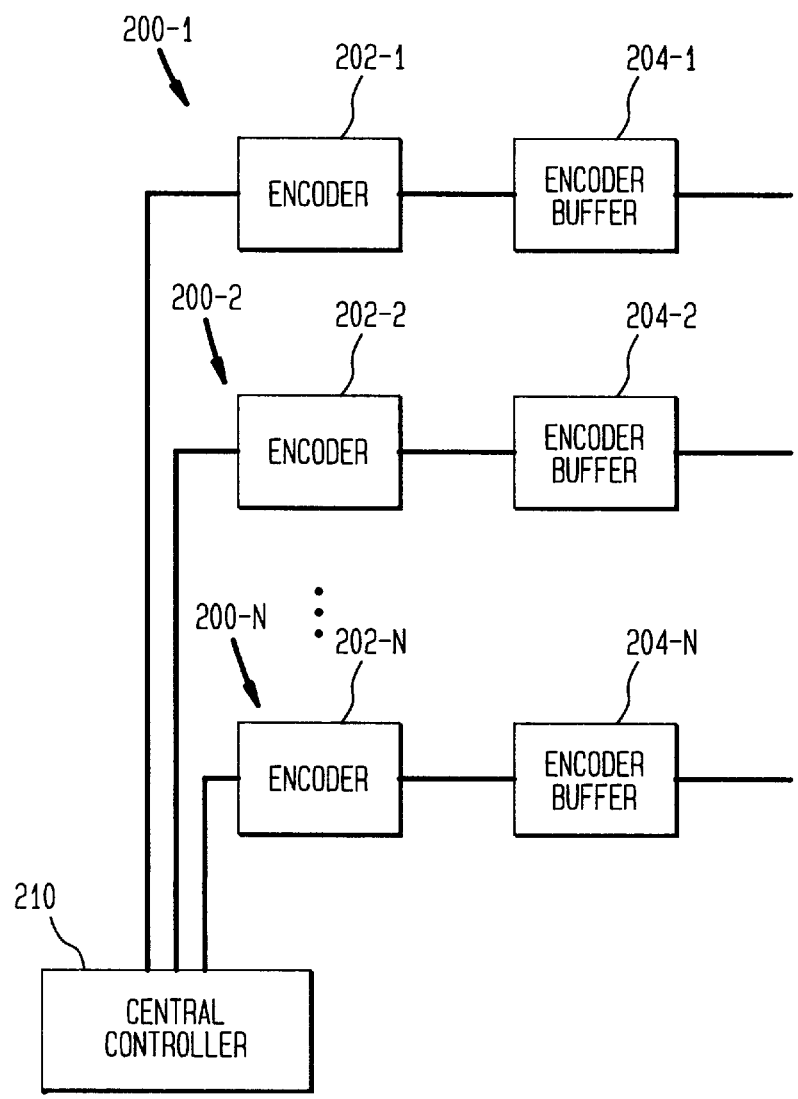
FIG. 7A illustrates a statistical multiplexing system in which a plurality of encoders of the type shown in FIG. 1A communicate with a central control unit.

Such a statistical multiplexing system is shown in FIG. 7A. A plurality of encoder systems 200-1, 200-2, . . . , 200-N are controlled by a central controller 210. Each encoder system 200 comprises an encoder 202 and an encoder buffer 204. The internal structure of an encoder is described above in connection with FIG. 1A and FIG. 1B. The central controller 210 may communicate with the local controller which is part of each encoder 202. The central controller may be implemented using a general purpose CPU or DSP (Digital Signal Processor) or implemented as a dedicated integrated circuit. The algorithms implemented by the dedicated central controller are described below in connection with FIGS. 7B and 7C. Each encoder 200 reports its status to the central encoder 210 after encoding a frame, and accepts any changes to its, operation parameters (such as bitrate).

The task of optimal rate allocation is shared among the central control unit and each encoder in the following way illustrated in FIG. 7B.

Figure 7B:
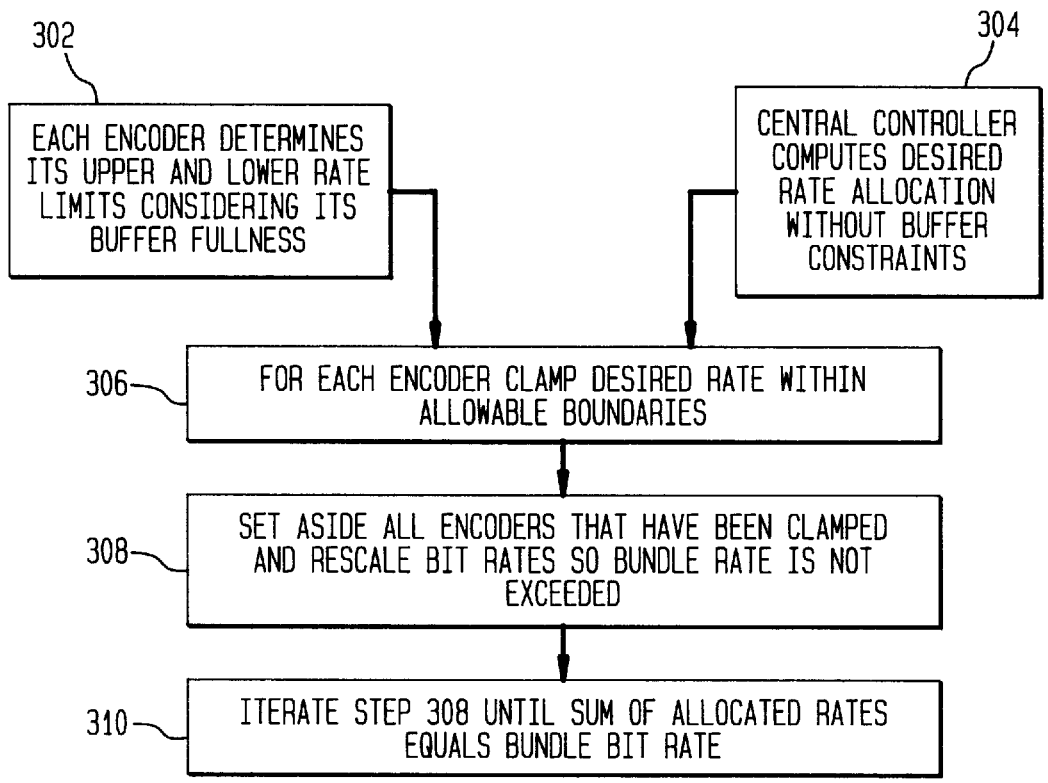
FIGS. 7B and 7C are flow charts of algorithms carried out by the central controller of FIG. 7A.
Figure 7C:
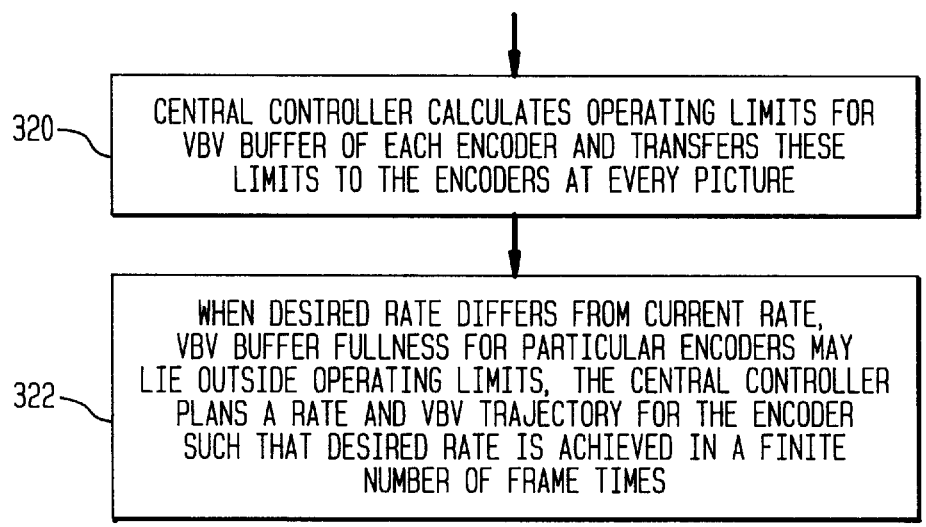

After completing the encoding of the current frame, each encoder computes the upper and lower rate limits considering its VBV buffer fullness (step 302 of FIG. 7B). In the meantime, the central control unit has already computed the desired rate allocation without any buffer constraints (step 304 of FIG. 7B). This may take as long as a frame time. Then, for each encoder, the optimal rate is clamped to be within its allowable rate boundaries (step 306 of FIG. 7B). In general, as a result of this clamping, the sum of individual rates will not be equal to the bundle rate (i.e., the total channel rate R).

Let's consider the case where the sum of the adjusted rates is less than the bundle rate (this will occur if a large amount of bits are clamped at the upper limit of individual encoders). The simplest solution is for the central controller to set aside all encoders that have been clamped, and rescale the rest such that the sum of all the encoders is equal to the bundle rate (step 308 of FIG. 7B). Note that the resealing may cause some encoders to fall outside their allowable range (upper range in this example). Therefore, this procedure needs to be iterated by the central controller until all the constraints are satisfied, and the sum of the individual rates is equal to the bundle rate (step 310 of FIG. 7B).

This basic algorithm may be further improved. First, in the earlier example, it is suboptimal to set aside the encoders that have been clamped at their lower limits. That is because the resealing may cause the desired rate for this encoder to rise above the clamped value. An intermediate solution may involve clamping those encoders that have a large difference between their lower limits and desired operating rates, and allow others to be rescaled.

This method provides a good approximation to the optimal operation point. Now we need a method to make it possible to actually converge to the optimal point. This method is carried out by the central controller using the algorithm illustrated in FIG. 7C.

Each encoder maintains the desired operating limits for its VBV buffer. For each encoder, the central control unit calculates these values and transfers them at every picture (step 320 of FIG. 7C). In particular, when the desired rate differs significantly from the current rate, the buffer fullness may lie outside the desired range. In this case, the central control unit may plan a trajectory for the rate and VBV buffer fullness such that the desired rate may be achieved in a finite number of frames (step 322 of FIG. 7C). However, since the optimal rate allocation is a moving target and changes with the changing input statistics, this point may never be achieved in practice. The VBV buffer trajectory is the trajectory of VBV occupancy as a function of frame number. The rate trajectory of an encoder is the allocated rate as a function of frame number.

The central control unit may get advance information about the changes in each encoders input. For example, in a typical set up, the frame activities may be available several frames ahead. This may allow sufficient time for a desired VBV buffer fullness to be reached before the rate change needs to take place.

H.8 Inverse Telecine Processing

In inverse telecine processing, the encoder detects and drops (does not encode) repeated fields which are present in the 3:2 pulldown sequence.

The dropped fields affect the rate control algorithm.

As the frame time is no longer constant (some frames have a duration of two field periods and some frames have a duration of three field periods), a weighted time average of frame periods is determined. Let $T_i$ be the number of fields in frame i. Thus, $T_i$ has the value two or the value three. Then, $\bar{T}_i$, the average number of fields per frame is $$\bar{T}_i = \frac{1}{2N} \sum_{j=i-N}^{i} T_j \tag{14}$$

where N is a number of frames.

Let f be the input frame rate as specified in the sequence header.

The effective frame rate $f_{eff}$ is given by $$f_{eff} = (2/\bar{T}_i)f \tag{15}$$

This average frame rate should be utilized in determining the budget $BB_i$ for each frame i.

In particular, in Equation (1), $$K_I + K_P + K_B = f_{eff} = (2/\bar{T}_i)f \tag{16}$$

Alternatively, equation (1) can be rewritten as $$BB_i = (S_i \bar{Q}_i)(\bar{T}_i/2) R_{eff} / \sum_{j=I,P,B} K_j S_j \bar{Q}_j \tag{17}$$

When a frame has a duration of three field periods, the VBV buffer is allowed to fill at the regular rate $R_{eff}$ for three field periods. Therefore, the zero stuffing condition needs to be adjusted so that the VBV buffer does not overflow during this extra field period. Equation (8) is modified so that $$d_{i-1} \geq B - (2/f)(R_{eff}/T_i) + \text{safety margin} \tag{18}$$

where $d_{i-1}$ is the VBV occupancy after bits corresponding to picture i−1 have been removed from the buffer and $T_i$ is the number of fields displayed for the following picture (in encode order).

I. Rate Control for Variable Bit Rate Controller

The rate control algorithm described above may be modified for use with a variable bit rate, non-real time encoder. The variable bit rate non-real time encoder is especially useful for generating bit streams to be stored on digital video disks (DVDs).

A variable bit rate, non-real time, multi-pass encoding algorithm is described below in connection with FIG. 8.

This algorithm proceeds as follows:

1. The sequence of input frames is coded in a first coding pass. In the first encoding pass (step 200 of FIG. 8), VBV enforcement is disabled. Moreover, the rate control quantization scale factor is fixed. The rate control quantization scale factor is not a function of virtual buffer fullness. The fixed rate control quantization scale factor is multiplied by a variable masking activity quantization scale factor for each macroblock in a frame.

Figure 8:
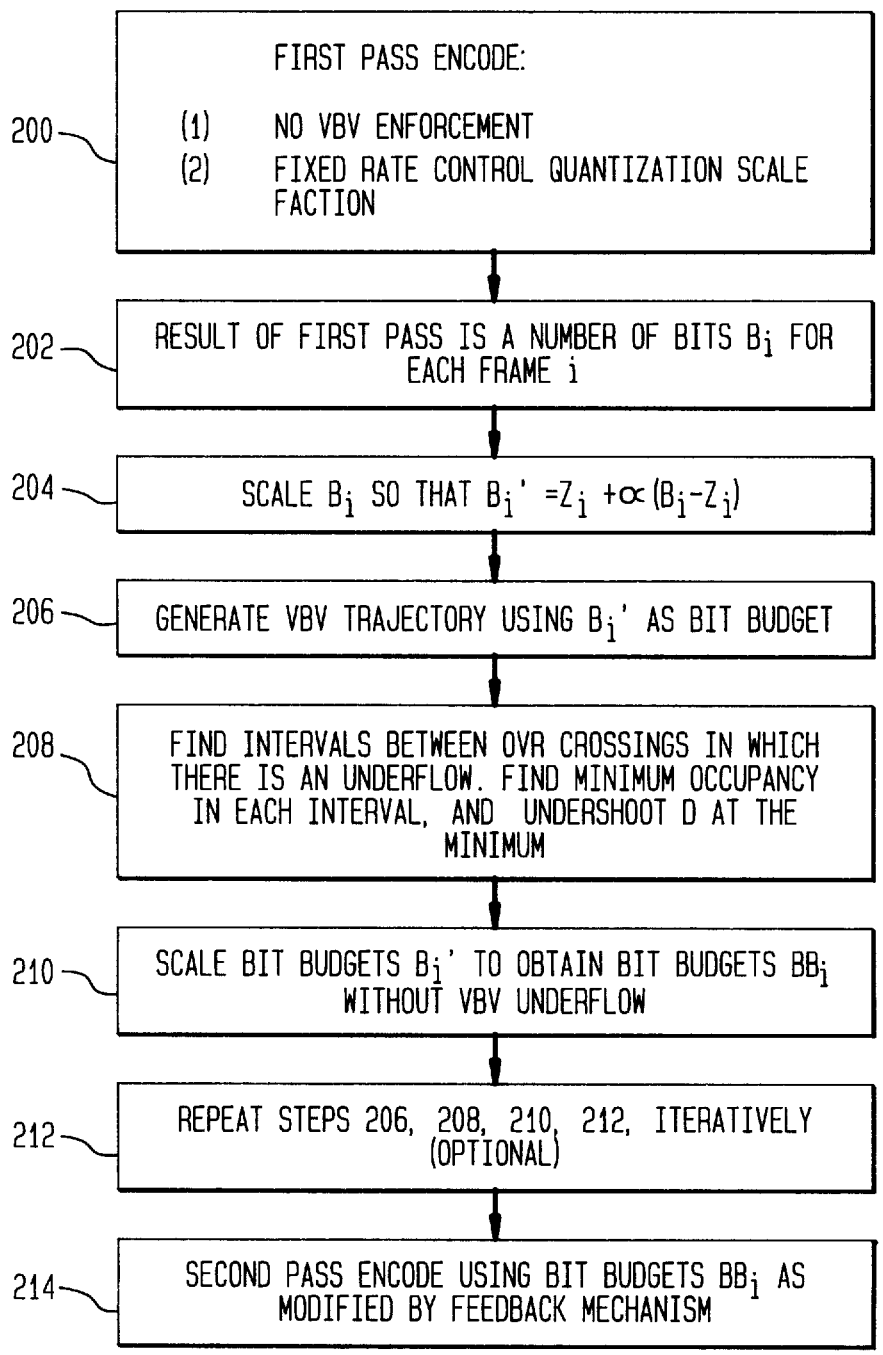
FIG. 8 is a flow chart for rate control for non-real time, multiple pass, variable bit rate encoding.

The result of the first pass is that a number of bits $B_i$ is determined for each frame i in the input sequence of frames to be encoded (step 202 of FIG. 8).

2. The result of the first pass encode is a number of bits $B_i$ used to encode each frame i (step 202 of FIG. 8) The total number of bits from the first pass is $$B_{Total} = \sum_{i=0}^{L-1} B_i$$

where L is the total number of frames in the input sequence.

Suppose the desired target is $B_{Target}$ bits in L frame. Let $Z_i$ represent the unavoidable total overhead bits for frame i. The number $Z_i$ in general depends on the frame type. Thus, $$B_{Total} = \sum_{i=0}^{L-1} Z_i$$

represents the number of dicretionary bits from the first pass

The number of bits $B_i$ used to code each frame in the first pass is then scaled (step 204 of FIG. 8) by a scale factor α, where $$\alpha = \frac{B_{Target} - \sum_{i=0}^{L-1} Z_i}{B_{Total} - \sum_{i=0}^{L-1} Z_i}$$

and $$B_i' = Z_i + \alpha(B_i - Z_i)$$

If $B_i'$ were to be used as the bit budget for each frame i, the constraint of not exceeding the target number of bits $B_{Target}$ is satisfied. In addition, a desired average bit rate is also met by the bit budgets $B_i'$. However, there is no assurance that the bit budgets $B_i'$ will not exceed a maximum bit rate $R_{max}$. If an encoder generates bits at a rate that exceeds $R_{max}$, it will lead to an underflow of the decoder buffer (and the VBV) because more bits are being generated than can be transferred to the decoder buffer.

Figure 8A:
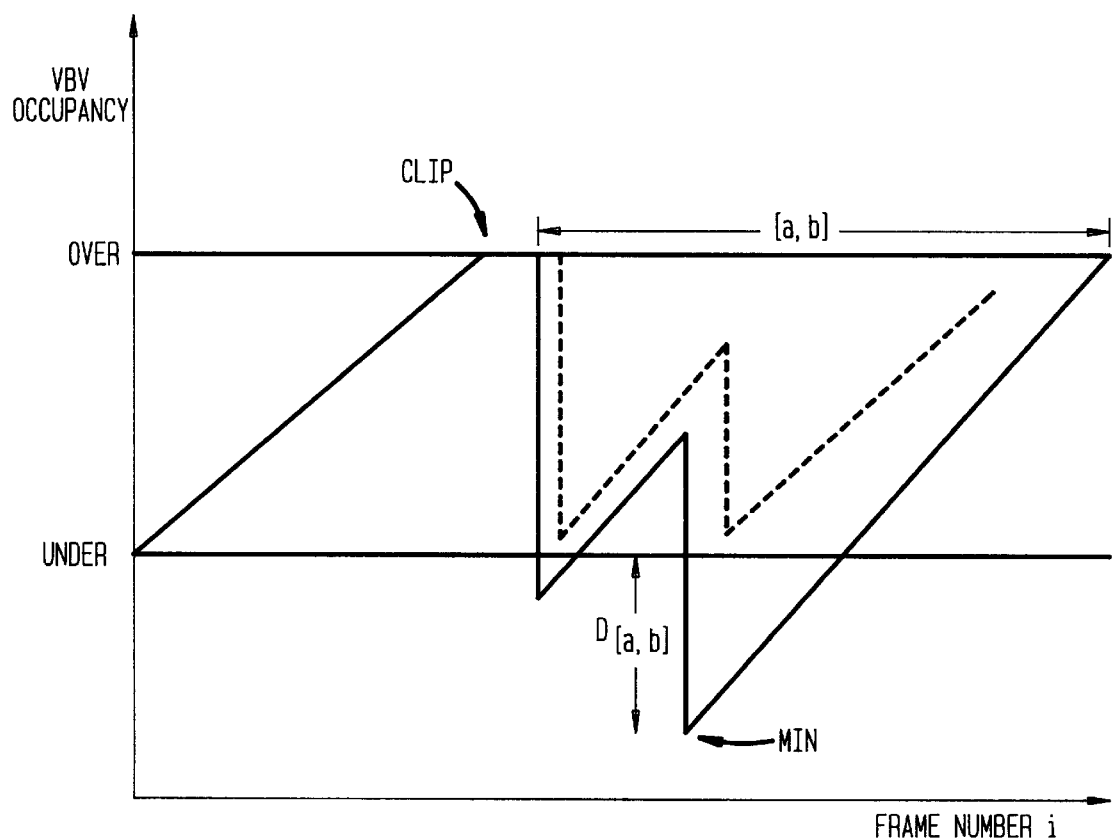
FIG. 8A shows how the bit budget for each frame in the variable bit rate encoding process is adjusted to prevent VBV underflow.

3. To solve this problem, the encoder generates the VBV trajectory which would result from the bit budgets of $B_i'$ (step 206 of FIG. 8). Such a trajectory is shown in FIG. 8A. FIG. 8A plots VBV occupancy as a function of frame number. OVR designates the maximum VBV capacity. UNDR indicates the minimum VBV capacity. Thus, when the trajectory exceeds OVR, there is a VBV overflow. When the trajectory falls below UNDR, there is a VBV underflow.

No steps are taken to prevent VBV overflow. Rather, when a DVD is being read, and the VBV occupancy reaches OVR, no further bits are taken from the disk player. Thus, the VBV trajectory is clipped. As indicated above, VBV overflows are permitted for a VBR encoder according to the MPEG-2 standard.

The following steps are utilized to correct the budgets $B_i'$ to eliminate VBV underflows and thereby ensure that a maximum channel rate $R_{max}$ is not exceeded.

(a) find the intervals [a,b] between OVR crossings in which there is VBV underflow (b) for each interval [a,b] between OVR crossings, find the minimum VBV occupancy and the undershoot $D_{[a,b]}$ where $D_{[a,b]}$ is the amount of bits the VBV occupancy is below UNDR at the minimum (step 208 of FIG. 8) The total number of bits allocated to the interval [a,b] is $$\sum_{i=a}^{i=b} B_i' = B_{Total_{[a,b]}}$$

Generate the bit budgets $BB_i$ for each from according to $BB_i = B_i'$ outside the intervals [a,b]

$$BB_i = \frac{(B_{Total,[a,b]} - D_{[a,b]})}{B_{Total[a,b]}} B_i' \text{ inside each interval } [a,b]$$

The result of this scaling is indicated by the dotted line in FIG. 8A and corresponds to step 210 in FIG. 8.

(d) To improve the performance of this algorithm, the encoder can generate a new VBV trajectory using the bit budget $BB_i$. If there are still VBV underflows, the steps a, b, c are repeated (step 212 of FIG. 8)

4. The sequence of input frames is now encoded again in a second coding pass (step 214 of FIG. 8). In the second pass, the rate control quantization scale factor is not fixed and is free to vary with virtual buffer fullness. There is no VBV enforcement during the second coding pass.

However, a feedback mechanism is used to account for deviations between $BU_i$, the actual number of bits used to code frame i and $BB_i$, the bit budget for frame i. The cumulative frame budget deviation $CE_i$ is updated as follows:

$$CE_i = CE_{i-1} + BU_i - BB_i$$

The modified bit budget $BB_{i+1}$ is computed as:

$$BB_{i-1} \rightarrow BB_{i+1} + \delta_b CE_i$$

where $\delta_b$ is a constant, e.g. 0.1.

An additional feedback mechanism may be used within a frame or picture. Let $BB_{i,n}$ be the number of bits budgeted for macroblock n in frame i. Let $BU_{i,n}$ be the actual number of bits used to encode the macroblock n in frame i. The cumulative macroblock deviation in frame i is given by $$CE_{i,n} = CE_{i,n-1} + BU_{i,n} - BB_{i,n}$$

The modified macroblock budget for the macroblock (n+1) within frame i is given by $$BB_{i,(n+1)} \rightarrow BB_{i,(n+1)} + \delta_{bn} CE_{i,n}$$

where $\delta_{bn}$ is a constant (e.g. 0.1)

The encoded output stream of the second pass is now transmitted via a channel to a storage medium such as a digital video disk.

The above described two-pass variable bit rate encoding technique may be modified by adding a zero pass (i.e. a pass prior to the first pass). In the zero pass each field is compared pixel by pixel to the prior field $f_{i-1}$ and the next prior field $f_{i-2}$. A Mean Square Error or a Mean Absolute Error is obtained in each case. Using this information and possibly other statistics the encoder performs inverse telecine processing, scene change detection, and fade detection. In the zero pass, total activity and average intensity may be determined for the macroblocks in a field. In addition, the first two stages of the three stage motion estimation hierarchy may be performed in the zero pass. This enables certain motion estimation statistics to be obtained which are useful for scene change detection.

It should be noted that the variable bit rate encoding technique described above is applicable to a sequence of field pictures as well as a sequence of frame pictures (which is the example provided above).

J. Overall Encoder Rate Control Implementation

Figure 9:
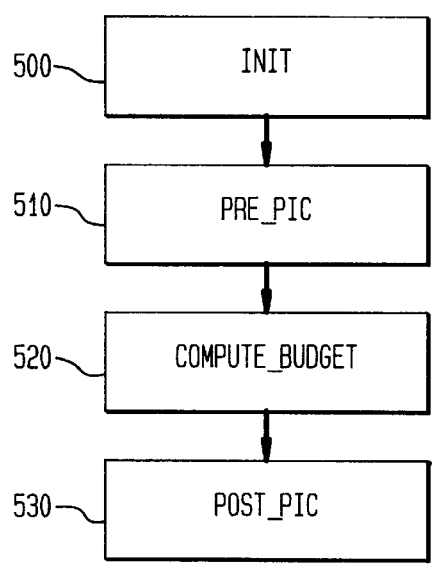
FIG. 9 is a flow chart of an overall implementation of an encoder according to the invention.

The overall encoder implementation may be viewed as a pipeline in which several functions are implemented. The pipeline is illustrated in FIG. 9 and is described below. In the discussion, it is useful to distinguish between a previous frame whose encoding is complete, a current frame which is currently being encoded, and a next frame whose encoding has not yet started.

The pipeline functions are as follows:

init (Step 500 of FIG. 9) All rate control parameters are initialized to default startup values according to the configuration options selected at run-time (such as choice of linear versus non-linear rate control quantization scale factor). This function is executed only at startup (or restart).

pre_pic (Step 510 of FIG. 9) At this point, the master has finished encoding, and slaves are still busy encoding the current frame. This function finishes all the calculations related to the previously encoded picture, and prepares for the next picture.

1. Compute $R_{eff}$ using VBV feedback. Since the number of bits used by the current frame is not available, the previous VBV fullness is used.

2. Process the next frame's activities to obtain masking activity quantization scale factor and estimated bit budget per macroblock.

3. Using an observation window of several frames, detect whether there is a fade. Average field brightness and field activities are used for this detection. If there is a fade, then constrain the motion estimation to a small range. Once set, the fade detected flag remains on for several frames.
4. If there is no fade, then test to see if there is a scene change. This way, a fast cross-fade is not classified as a scene change.
5. Update the statistics related to the previous frame that are not critical for the current frame's budget. Note that the current frame is being encoded at this time, so this calculation is delayed to reduce the real-time critical path.

compute budget (Step 520 of FIG. 9) At this point, the slaves are still busy and the VBV fullness is not known. Therefore, the budget computed here is subject to further change.

1. If a scene change was detected, then calculate the new budget using the VBV fullness and coding rate.

The VBV fullness is only an estimate, since the exact fullness is not known at this stage. Adjust the virtual buffer fullness according to the bit budget. Use default values for P and B frame budgets.

2. Else, if a fade was detected, then increase the B frame budgets (for example by 20%). Also make sure that B frame virtual buffer is not more full than P frame virtual buffer.
3. Else, use the default formula to compute the bit budget.

post_pic (Step 530 of FIG. 9) At this point, slaves report their status.

1. Update the virtual buffer corresponding to the previous frame.
2. Update VBV fullness.
3. If necessary, insert zero stuffing.
4. Adjust the previously computed bit budget if necessary. If the now completed current frame took more bits than planned, it may be necessary to reduce the next frame budget.
5. Report the bit budget to the slaves, and start encoding the next frame.

Conclusion

A rate control algorithm for an MPEG-2 compliant digital video encodes has been disclosed. The rate control algorithm has embodiments which may be utilized for constant bit rate and variable bit rate encoding.

Finally, the above described embodiments of the invention are intended to be illustrative only. Numerous alternative embodiments may be devised by those skilled in the art without departing from the spirit and scope of the following claims.

We claim:

1. In a statistical multiplexing system comprising a plurality of video encoders and a central controller in communication with the encoders, a method for allocating the bandwidth of a shared channel among said encoders comprising the steps of (a) at each encoder determining upper and lower rate limits for the encoder depending on the fullness of an output buffer of the encoder, (b) computing at said central controller, a desired rate allocation for each of said encoders independent of the limits determined in step (a), (c) for each encoder, clamp the desired rate allocation determined in step (b) to be within the limits determined in step (a)

(d) rescale the bit rates allocated in step (b) so that a bundle rate of the channel is not exceeded while excluding from the rescale one or more of the clamped encoders, and (e) encoding a sequence of video images at said encoders in accordance with the rates determined in step (d).

2. The method of claim 1 wherein step (d) is iterated a plurality of times.

3. The method of claim 2 wherein said central controller generates a VBV and rate trajectory for one of said encoders so that the desired rate is achieved in a finite number of frame times.

\* \* \* \* \*